United States Patent [19]

Hurst

[11] 4,077,588

[45] Mar. 7, 1978

[54] PERMANENTLY BUOYANT BALLOON

[76] Inventor: Gerald L. Hurst, 1401 Spring Garden, Austin, Tex. 78746

[21] Appl. No.: 613,518

[22] Filed: Sep. 15, 1975

[51] Int. Cl.² .............................................. B64B 1/40
[52] U.S. Cl. ..................................... 244/31; 244/126; 427/250; 46/87
[58] Field of Search ....................................... 46/87–90; 244/31, 33, 128, 126, 153–155, 105; 280/480

[56] References Cited

U.S. PATENT DOCUMENTS

| | | | |
|---|---|---|---|
| 2,713,746 | 7/1955 | Haugh | 46/87 |
| 2,878,013 | 3/1959 | Piodi | 280/480 |
| 3,004,737 | 10/1961 | Boyle et al. | 244/105 |
| 3,088,242 | 5/1963 | Rockovits | 46/90 |
| 3,094,807 | 6/1963 | Dorman | 46/90 |
| 3,184,742 | 5/1965 | Cutler | 244/31 |
| 3,230,663 | 1/1966 | Shabram | 46/90 |
| 3,248,735 | 4/1966 | Bartolini | 244/33 |
| 3,608,849 | 9/1971 | Underwood | 244/31 |
| 3,740,254 | 6/1973 | Lansbury et al. | 427/250 |
| 3,783,012 | 1/1974 | Morita et al. | 427/250 |
| 3,914,471 | 10/1975 | Cobb et al. | 427/250 |

FOREIGN PATENT DOCUMENTS

| | | | |
|---|---|---|---|
| 219,440 | 1/1909 | Germany | 244/126 |
| 347,987 | 5/1931 | United Kingdom | 244/126 |

OTHER PUBLICATIONS

Goldie, "Metallic Coating of Plastics", Electrochemical Publications Limited, 1968, pp. 15-21, 155-225.
Narcus, "Metallizing of Plastics", Reinhold Publishing Corp., New York, pp. 169-170.

Primary Examiner—Galen L. Barefoot
Attorney, Agent, or Firm—Richards, Harris & Medlock

[57] ABSTRACT

A substantially permanently buoyant balloon suitable for use as a toy or in advertising, for example, is provided which includes an envelope containing a lighter than air gas such as helium, which envelope is made from attached panels of a nonelastomeric polymer sheet material carrying a continuous metal layer on at least one side thereof. The metal layer can either be a thin metal film contiguously bonded to the polymer, or can be metal which is vapor deposited over the surface of the polymer. The balloon itself is constructed so that the ratio of its volume taken to the two-thirds power divided by its surface area is in the range of from about 0.21 to about 0.01, and the weight of the envelope can range from about $2.6 \times 10^{-4}$ gm/cm² to about $1.7 \times 10^{-2}$ gm/cm². The envelope is preferably manufactured in two dimensional "lay-flat" form in any desired two dimensional shape unlike conventional balloon envelopes which are inherently three dimensional surfaces. Balloon envelopes having the above described volume to surface area ratio and made with the above described composite panel material will be maintained buoyant for an indefinite period of time when filled with the lighter than air gas.

17 Claims, 16 Drawing Figures

PERMANENTLY BUOYANT BALLOON

BACKGROUND OF THE INVENTION

This invention relates to lighter than air balloons. In another aspect, this invention relates to a novel substantially balloon for use as a toy or in advertising which will remain buoyant for an indefinite period of time in excess of about one year with a potential maximum lifetime exceeding several years, e.g., at least 30 years.

Conventionally small toy or advertising balloons are made by filling an elastomeric material with a helium containing gas. Such lighter than air balloons have been commonly used and sold for many years at fairs, circuses, restaurants and shopping centers and the like, where helium is available to fill the balloons shortly before use or sale. Thus, it is commonly known that such balloons invariably lose their buoyancy within a matter of a few hours or few days at most, as the result of helium losses by diffusion through the elastomeric envelope material. Therefore, such balloons have not been marketed through conventional channels of commerce because of the limited shelf life amounting to only a matter of days. The limited lifetime of such balloons as disappointed millions of children and has prevented the sale of the buoyant balloons by the vast majority of merchants who do not have the resources to fill the balloons as they are sold and who cannot afford the inevitable losses which are associated with the short shelf life of the product.

Larger aeronautical balloons have been made which have relatively long buoyant lifetimes. In general, as the volume of a balloon is increased then it becomes easier to design relatively impermeable envelope materials, because the larger volume of gases will support the relatively thick envelope which is necessary to provide impermeability for the lighter than air gases. Much work has been conducted in the field of large aeronautical balloons to devise composite envelope materials which are relatively impermeable to gases and provide great strength. For example, German Pat. No. 217,110 discloses an envelope material made by gluing galvanic metal paper to cotton, linen or silk cloth. German Pat. No. 219,440 discloses a balloon envelope material made by sandwiching cloth between sheets of aluminum and copper. German Pat. No. 224,521 discloses a balloon envelope material made by bonding corrugated sheets of metal, glass or organic material to fabrics. German Pat. No. 227,150 discloses balloon envelope materials which are made less permeable by deposition of a metallic mirror finish thereto in a reducing bath. German Pat. No. 515,083 discloses balloon envelope material made by gluing cellulose skin to metal foil to mutually increase the strength of the layers. U.S. Pat. No. 1,793,075 discloses gas envelope material made by combining layers of rubberized fabric, rubber cement and metal leaf. U.S. Pat. No. 1,801,666 discloses a gas envelope material made by coating a sheet of aluminum with a tacky rubber isomer, baking the resulting composite to form an enamel coat and adhering the resulting sheet to fabric, paper, rubber or leather. None of the above patents disclose methods by which the composite sheet materials can be fashioned into balloon envelopes other than by the conventional methods of sewing, taping and joint caulking which are only suitable for the very large aeronautical balloons which have a substantially large wall thickness of the envelope material.

As is apparent from the above discussion based upon relatively old patents, most of the research in balloon technology occurred before the World War II era and was related to aeronautical type balloons for transmitting men and/or equipment. In these patents, the words "gastight" or "gasproof" or "impermeable" are used in a loose sense to describe virtually all nonwoven or nonporous materials. For example, U.S. Pat. No. 2,730,626 described rubber material as "gastight material" whereas such materials invariably have measurable permeability to lighter than air gases. Similarly, U.S. Pat. No. 1,449,748 describes rubber impregnated fabric coated with drying oil and aluminum powder as "gasproof" where "gas resistant" would be more accurate. As a further example of this usage, treated animal skins were inaccurately described as "gastight" or "impermeable" in U.S. Pat. No. 1,709,499 and German Pat. No. 227,521. Thus, when the ratio of a balloon's volume to the surface area of its envelope is relatively large, e.g. Volume/Area greater than 0.2 meters (0.7 ft.) and typically greater than 1.5 meters (5 ft.), then the normal diffusion of the lighter than air gas such as helium through the envelope material is negligible in that the balloon can remain buoyant and aloft for several days and even several years and thus fulfill its designed capability. Therefore, the prior art balloon envelope materials discussed in these patents which relate to larger aeronautical balloons are described as impermeable or gasproof even though such materials are not truly impermeable or gasproof.

It is known to use metal powdered coatings on a balloon envelope for the purpose of protecting the envelope from heat and light but not to significantly improve gas impermeability. Disclosures of such coatings are found in German Pat. Nos. 276,717; 286,260; and 262,005. Furthermore, metal layers have been provided on a balloon envelope to improve electrical conductivity such as described in U.S. Pat. No. 1,180,732, or to improve the special characteristics of weather balloons in which an indefinite life is undesirable, as described in U.S. Pat. No. 3,340,732.

Recent developments in aeronautical balloon technology disclosed the use of biaxially oriented plastic film from polyolefins such as described in U.S. Pat. No. 3,608,849. Again, with the large aeronautical balloons with envelopes which have relatively large volume to surface area ratios, it is not necessary to have completely gas impermeable envelopes in order for the balloon to have a very long buoyant lifetime.

Thus, all of the teachings referenced above are concerned with aeronautical balloons which range from weather balloons having a volume approximately 100 cu. ft. to larger balloons intended for practical lifting of men or materials which range in volume from about 2000 cu. ft. to over 1 million cu. ft. The materials disclosed as suitable for such large balloons cannot be scaled down to form suitable toy or advertising balloons which have a volume in the order of 20 cu. ft. or smaller because the increase in surface area in relation to volume of the resulting envelope accompanying such a reduction in size will allow too much of the lighter than air gas to escape through the envelope material.

For example, with a given polymeric envelope material of given permeability and configuration, the buoyant lifetime ($T_L$) varies in proportion to the square of the linear size (D), e.g., the diameter or radius in the case of a sphere, as defined by the equation $T_L \propto D^2$.

Using this common mathematical expression it is readily possible to compare the performance of relatively smaller balloons to that of a hypothetical large spherical balloon having a radius of 62 ft., a corresponding volume of 1 million cubic feet and a reasonable hypothetical buoyant lifetime expectancy of 100 years based on the properties of conventional balloon envelope materials. Such a balloon would correspond in size to a large blimp or dirigible gas bag and its efficiency in terms of buoyant lifetime or rate of helium loss is so great that any further improvement in buoyant lifetime is economically trivial. The choice of this extremely large balloon for a standard is also significant because the relatively thick envelope allows the use of sophisticated complex laminate envelope material which cannot in actual practice be scaled down for a smaller balloon. The scaling down of this balloon to a small blimp having a sphere radius of 36 ft. and a volume of 200,000 cu. ft. will result in a hypothetical buoyant lifetime of 34 years. Further scaling down such balloon to a typical 1 to 4 man sporting balloon having a sphere radius of 18 ft. and a volume of 24,000 cu. ft. results in a hypothetical buoyant lifetime of 8.4 years. Further scaling the large balloon down to a size of a minimum size man lift balloon having a sphere radius of 12 ft. and a volume of 7,000 cu. ft. results in a hypothetical buoyant lifetime of about 3.7 years. To further scale such large balloon down to the size of a toy balloon having a sphere radius of 0.49 ft. and volume of ½ cu. ft. results in a hypothetical buoyant lifetime of only about 2.3 days. Thus, it is clear that conventional balloons with relatively long hypothetical buoyant lifetimes, cannot be effectively scaled down using existing balloon envelope technology to yield small balloons having a volume of 20 cu. ft. or less and relatively small volume to surface area ratios but also relatively long buoyant lifetimes.

SUMMARY OF THE INVENTION

According to the invention, I have discovered that buoyant balloons having extremely long and indefinite lifetimes but also having a relatively small volume to surface area ratios can be made utilizing a balloon envelope material which comprises a composite of a nonelastomeric polymer sheet or laminate which carries a continuous layer or coating of a metal on at least one side thereof, and wherein the envelope has an internal volume of up to about 20 cu. ft. and a ratio of its volume taken to the two-thirds power to its surface area of from about 0.21 to about 0.01, and furthermore wherein the average weight of the envelope is in the range of from about $2.6 \times 10^{-4}$ gm/cm² to about $1.7 \times 10^{-2}$ gm/cm². The continuous metal layer can be a thin metal film or foil such as an aluminum foil laminated to the nonelastomeric polymer, or in a preferred embodiment of the subject invention the metal coating can be formed on the nonelastomeric polymer sheet by vapor deposition techniques including vacuum metallizing, vapor phase deposition and cathode sputtering.

In accordance with one embodiment of the subject invention, the balloon envelope is made by sealing, such as heat sealing peripheral portions of panels made of the above material while in a two dimension lay-flat form to any desired two-dimensional shape. The resulting envelope is filled with a lighter than air gas, preferably helium, and it is substantially impermeable thereto and will remain buoyant for a long period of time.

SHORT DESCRIPTION OF DRAWINGS

This invention can be more easily understood from a study of the drawings in which:

FIGS. 9 through 15 illustrate some typical envelope shapes which can be utilized in the scope of the subject invention.

DETAILED DESCRIPTION OF THE INVENTION

Figure 1:
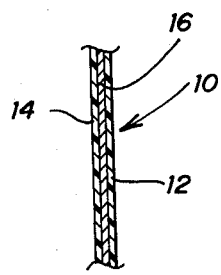
FIGS. 1 through 4 are cross sectional views of various envelope materials which can be used in the balloon of the subject invention.

As set forth in the prior art description of this specification, it is impossible to scale down engineering designs of large aeronautical balloons to design small balloons having a volume of about 20 cu. ft. or less and which have long buoyant lifetimes, e.g., which exceed several weeks. In essence, in the larger aeronautical balloons which have a relatively large ratio of volume to surface area, some diffusion of the lighter than air gas from the interior through the envelope is permissible. Furthermore, because of the relatively large volume of the gas, the envelope can be relatively thick and heavy, but yet still be lifted by the large volume of buoyant gas. When using conventional techniques, however, in designing smaller balloons, in order to have a buoyant body, the wall thicknesses of conventional materials are generally so thin that the lighter than air gas easily diffuses therethrough and thus the balloon loses its buoyancy in a relatively short period of time. In essence, I found that in order for a balloon which is a toy balloon or an advertising balloon having up to about 20 cu. ft. in volume to be substantially permanently buoyant, it is necessary that the envelope be substantially impermeable to the lighter than air gas it carries, typically helium, because the volume to surface area ratio is so small that even slight permeability of the envelope results in disastrous loss of the buoyant fluid. In addition, it is necessary that the envelope material not be so heavy as to offset the gross lifting force of the buoyant fluid.

Inflatable balloons and toys are not presently made of such an ideal envelope material. For example, small elastomeric balloons which are normally filled with helium usually become nonbuoyant within two or three days because of diffusion of the helium through the elastomeric skin. Furthermore, the materials with which nonbuoyant air inflatable toys are made are not acceptable even though such toys can be filled with air and remain filled with air indefinitely. The reason for this is that these toys contain air, at most, at a trivial pressure above atmospheric and thus air diffuses both in and out of the plastic envelope at about equal rates so that there is no driving force for deflation. Furthermore, such plastics with which the envelopes for the toys are made are far less permeable to $O_2$ and $N_2$ than to helium and the volume to surface area ratios are immaterial in non-air buoyant inflatable objects.

I have found that envelopes can be made which when filled with lighter than air gas remain substantially permanently buoyant for balloons up to 20 cu. ft. in volume if the envelope material comprises certain nonelastomeric polymer sheets having a continuous thin metal coating or layer thereon or therein. The envelopes of the subject invention also have a ratio of the initial internal volume ($V_o$) taken to the two-thirds power divided by the surface area (S) of the envelope in the range of about 0.21 to about 0.01, i.e., the ratio of ($V_o^{2/3}/S$) = ~ 0.21 to ~ 0.01. The unit weight of the envelope (depending upon the size) can range from a low of about $5.3 \times 10^{-4}$ lbs./ft.$^2$ ($2.6 \times 10^{-4}$ gm/cm$^2$) to a high of about $3.5 \times 10^{-2}$ lbs./ft.$^2$ ($1.7 \times 10^{-2}$ gm/cm$^2$).

In essence, the thin metal layer on the plastic is impermeable to the lighter than air gas and the layer of the nonelastomeric polymer provides structural integrity for the metal as well as filling any pinholes or imperfections that may exist in the continuous metal layer. The resulting composite is substantially impermeable to lighter than air gases such as helium which are used in the balloon as the buoyant fluid. The structure of the envelope material can take various forms, examples of which are illustrated in FIGS. 1 through 4 of the drawing. It is to be understood, however, that other structures can be utilized in the scope of the subject invention so long as they comprise the basic substrate of the nonelastomeric polymer having the continuous metal coating or layer thereon or therein and so long as the resulting unit weight of the composite and volume to surface area relationship of the envelope falls within the ranges set forth above.

Now specifically referring to FIG. 1, a cross sectional view of an envelope material which can be used in the scope of the subject invention is schematically depicted. As shown, the structure 10 comprises a laminate of a nonelastomeric continuous polymer film 12, e.g., polyethylene having a thickness of 0.1 to 6.5 mils, and a continuous layer 14 of a polymer which can be either similar or dissimilar to the polymer which forms layer 12, and a thin sheet of metal film 16 which is laminated to sheets 12 and 14 by conventional techniques such as heat laminating. The metal film 16 can be any thinly rolled film of any well known metal or alloy. Preferably, film 16 is a thin film of aluminum. Generally, the thickness of film 16 will depend upon the density of the metal and the malleability of the metal, but can range in thickness from about 0.1 to about 2.4 mils.

It is noted that layers 12 and 14 need not have the same thickness and indeed when layer 14 is the inner layer for the envelope, it is generally preferred that it be from 0.05 to 20 times as thick as the outer layer 12 and be used essentially to heat seal the various panels in the envelope together along peripheral portions thereof as well as to contribute to the increased strength of the envelope. A particularly acceptable combination comprises layer 12 made of polyethylene having a thickness of from 0.25 to 2 mils; layer 16 being a thinly rolled aluminum film having a thickness from 0.17 to 1.0 mils and layer 14 being a dissimilar resin to that in layer 12 such as a polyester having a thickness in the range of from 0.25 to 2 mils.

Essentially, all common continuous nonelastomeric polymer films are usable as layers 12 and 14 within the scope of the subject invention, for example, polyolefins such as polyethylene or polypropylene; polyvinylidene chloride (saran); polyester; polyvinyl chloride; cellophane; polyvinyl alcohol; regenerated cellulose, polyurethane, ethylene vinyl acetate copolymer, isonomers, polyamides and nitrile polymers, and the like. As stated, aluminum is the preferred metal to be used as layer 16, especially in the case of rolled metals. However, most malleable common metals can also be used so long as they can be rolled or drawn or formed into thin substantially continuous films. It is noted that these substantially continuous metal films can have numerous pinholes having a size ranging from microscopic to the order of several milimeters. Examples of other suitable metals include copper, gold, silver, iron, chromium, nickel, and the like.

Figure 2:
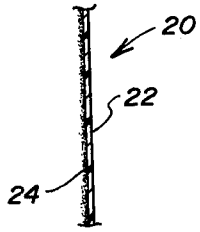
Figure 3:
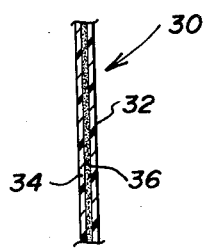
Figure 4:
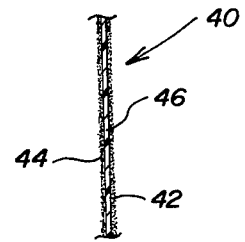

FIG. 2 depicts another composite envelope material which can be used in the scope of the subject invention. As shown, composite 20 comprises a basic substrate of a continuous nonelastomeric polymer film 22 which can be made of the same material as films 12 and 14 described in FIG. 1 above. However, the continuous layer 24 is a vapor deposited metal. Any conventional technique can be utilized for the vapor deposition of metal layer 24 upon the nonelastomeric polymer layer 22. It is noted that the vapor deposit shown as metal layer 24 in FIG. 2 is grossly exaggerated in thickness for illustrative purposes. Generally, layer 24 will have a thickness in the range of from about $3 \times 10^{-7}$ in. to about $2 \times 10^{-3}$ in. and preferably from about $1 \times 10^{-6}$ in. to about $5 \times 10^{-5}$ in. I found that the continuous nonelastic polymer film 22 can receive a coating of metal through vapor deposition sufficient to render the film essentially opaque and result in a substantially gas impermeable composite. Other examples of envelope materials which carry vapor deposited metal coatings thereon which can be used in the scope of the subject invention are schematically depicted in FIGS. 3 and 4. As illustrated in FIG. 3, composite 30 comprises two continuous nonelastomeric films 32 and 34 having a continuous layer 36 of vapor deposited metal sandwiched therebetween. This composite is conveniently made by initially vapor depositing the metal layer 36 on either layer 32 or 34 of the nonelastomeric polymer film and thereafter laminating the remaining layer of nonelastomeric film 32 or 34 to the vapor deposited metal layer. FIG. 4 illustrates still another composite 40 which can be used as balloon material in the scope of the subject invention. As shown, vapor deposited metal layers 42 and 44 are formed on both sides of the continuous nonelastomeric polymer film 46 in the manner described above. Any other metal-nonelastomeric polymer film composite can be used in the scope of the subject invention to produce the novel balloon envelope material so long as the average weight of the resulting film falls within the range of from about $2.6 \times 10^{-4}$ gm/cm$^2$ to about $1.7 \times 10^{-2}$ gm/cm$^2$.

Figure 5:
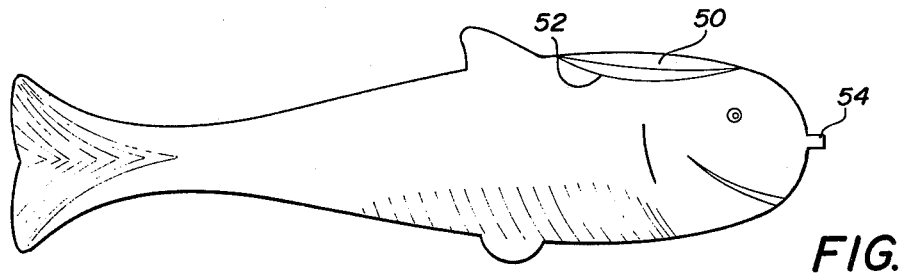
FIG. 5 is a plan view of panels for a specific balloon envelope which can be made in accordance with the subject invention.
Figure 6:
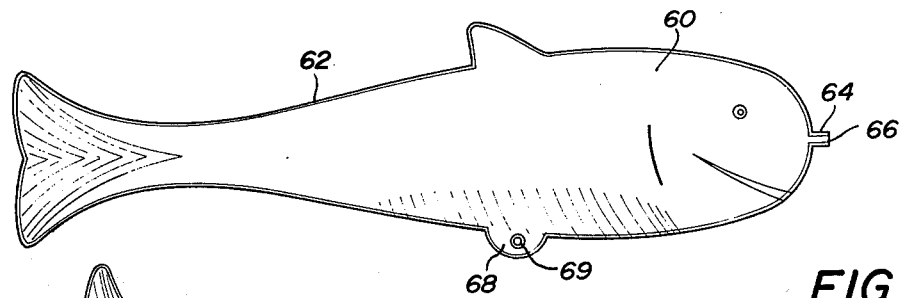
FIG. 6 is a plan view of two of the panels described in FIG. 5 sealed together at peripheral regions to form the lay-flat balloon envelope in the scope of the subject invention.
Figure 7:
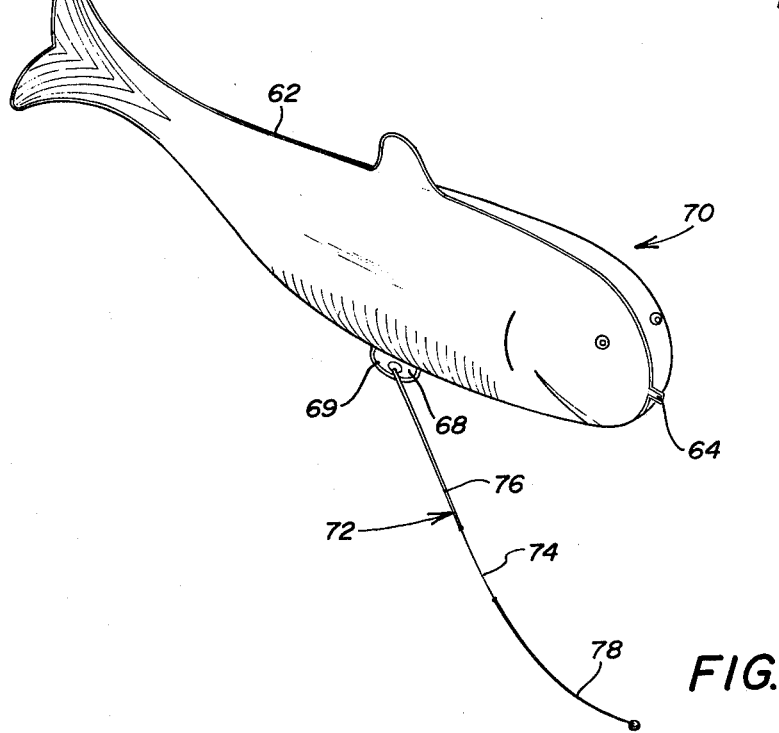
FIG. 7 is a perspective view of the envelope of FIG. 6 inflated with a lighter than air gas.
Figure 8A:
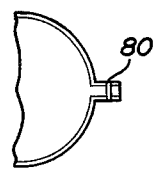
FIGS. 8a through 8c are partial detail views showing nozzle sealing arrangements for envelopes of the subject invention.
Figure 8B:
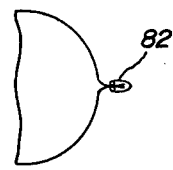
Figure 8C:
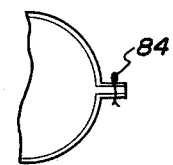

Now referring to FIGS. 5 through 8, a process is depicted for making a lay-flat balloon envelope in accordance with the subject invention. FIG. 5 depicts two juxtapositioned panels 50 and 52, each made of a composite metal nonelastomeric film in the shape of a fish. In general, panels 50 and 52 can be cut from sheets of the composite in any conventional manner. Tab 54 extends from the peripheral portions of panels 50 and 52 and will serve as a gas filling nozzle. As shown in FIG. 6, the two panels 50 and 52 are sealed together along seal area 62 (i.e., the peripheral portions of the two panels). Furthermore, if desired, when using heat sealable composite sheet materials 50 and 52, the seal 62 can be formed simultaneously when the fish shape is cut from the juxtapositioned sheets. It is noted that a filling nipple 64 is formed from tab 54 by not sealing the end portion 66 thereby allowing access to the interior of the sealed panels. In addition, as illustrated, anchor tab 68 is formed by sealing the two protrusions at the base of the body and a metal or plastic brad 69 is inserted therethrough. The balloon envelope is then filled with a lighter than air gas such as helium at about atmospheric pressure by inserting a hose from a helium source into the end portion 66 of nozzle 64 to form the inflated balloon 70 as shown in FIG. 7. The end of nozzle 64 is sealed at this point either with a heat seal as depicted as seal 80 in FIG. 8a, alternately, the nozzle 64 can be merely clamped with spring clamps 82 and/or 84 or the like as illustrated in FIGS. 8b and 8c. It is noted that if the inner layer of the two panels 50 and 52 forming the balloon 70 are compatible for heat sealing, then a suitable tool for heat sealing the end portion 66 of nozzle 64 can comprise a resistance heater and pressure bars in a pliers like device. Alternately, any other type of heat seal apparatus can be utilized. Virtually any type of common valve seal used for inflating conventional plastic toys and the like can also be utilized in place of the filling nozzle described above or such seals as adhesive patches and hypodermic type septums can likewise be used. Furthermore, with toy balloons such as fish 70, a special tether line 72 is preferred. Tether line 72 basically comprises an elastomeric section 74 which is interspersed between two non-stretchable sections 76 and 78. The elastomeric section 74 will provide a bouncing action when the balloon 70 is carried by the line 72 which is similar in feel to that experienced when an air buoyant elastomeric balloon is carried on a tether line. It is, of course, within the scope of the subject invention to include one or more elastomeric sections within tether line 72 or include a tether line 72 which is totally elastomeric to provide the "bounce" effect.

The characteristics of springy responses and ability to recover original shape after deformation, which are normally associated with elastomeric balloons, can also be imparted to the balloon of the present invention by attaching to the envelopes thereof one or more sections of elastic string, band or sheet material or the like in such a manner that the elastic material is reversibly stretched by inflation of the envelope, e.g., an elastic band may be attached at each of its ends to corresponding opposed points on the inner surfaces of two juxtapositioned lay-flat panels such that the relative motion of the two panels away from each other on inflation causes the band to stretch and thus create and maintain a slight pressure above atmospheric pressure in the envelope sufficient to keep the peripheral portions of the balloons inflated even after the loss of some buoyant gas. A similar effect can be achieved by placing a continuous, at least partially elastic band, around any exterior portion of the envelope before or after inflation, e.g. around the neck or waist of a human figure balloon.

It is noted that various sealing techniques can be used to seal the composite envelope sheet material to form the balloon envelopes in accordance with the subject invention. If the composite panels are heat sealable, then the panels can be heat sealed together in any conventional manner. For example, a jaw type sealer using a hot bar or rollers can be used to fabricate the heat seals, or impulse sealers can be used which deliver a controlled impulse of electrical current through a ribbon and the resistance of the ribbon converts this current to heat thus forming a seal. Alternately, a hot wire sealer can be used which basically comprises a heating element comprising hot wires which are heated by means of electrical current. Other types of thermal energy generating means can be used such as ultrasonic sealing, or sealing by light or other forms of radiant energy such as laser energy, dielectric sealing (electronic), induction bonding, or infrared bonding.

Furthermore, other means of sealing the envelope panels can be utilized in the scope of the subject invention other than heat sealing, such as for example adhesive bonding, solvent sealing, extruded bead sealing, and hot melt sealing. When sealing peripheral portions of the composite envelope panels together with adhesive bonding, an adhesive such as ethylene vinyl acetate can be applied to the peripheral portions of the envelope material such as through zone coating of these materials (i.e., the printing press method). Examples of other methods of applying such added sealant are by adding strips of a sealing material between the two films to be sealed at the sealing edges; extruding a flat strip of sealing material on the sealing edge; extruding a string of sealing material on the sealing edge; and adding a string of sealing material between the two films to be sealed at the sealing edges.

Various shaped balloon envelopes can be made in the scope of the subject invention. Some simpler shapes are illustrated in FIGS. 9 through 13.

Figure 9:
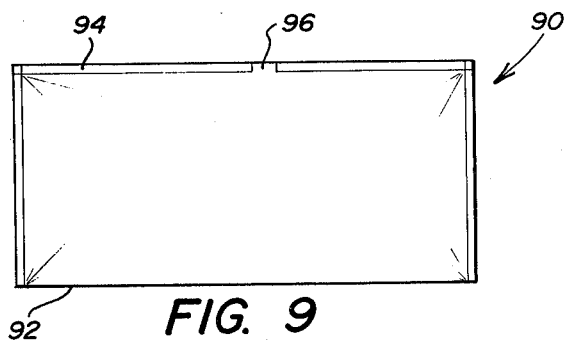

FIG. 9 illustrates a three sided seal pouch 90 which basically comprises a single piece of the composite envelope material folded at edge 92 to form two juxtapositioned panels which are then sealed face to face along seal area 94 on the two ends and side as illustrated. As shown, the nonsealed space or gap 96 forms a gas inlet for envelope 90 and can be sealed after the envelope is filled with a lighter than air gas by any technique set forth above. Alternately, a tab can be formed on the sheets to form a nozzle arrangement such as shown in FIGS. 5 through 8. The three seal pouch can be easily manufactured from a single web of material. The single web can be drawn over a triangular shaped mandrel and folded into a V-shape and then the heat seals can be made using crimping rollers for the side seal and rotary crimp jaws for the end seals in a continuous motion.

Figure 10:
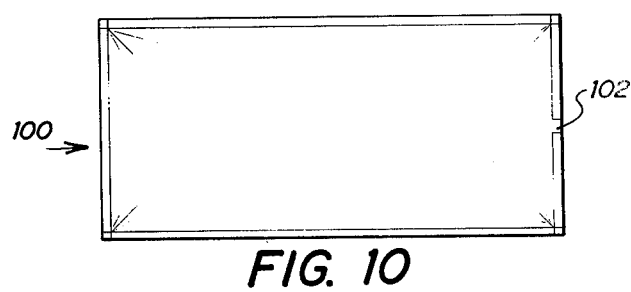

FIG. 10 illustrates another simple envelope shape which can be made in the scope of the subject invention. As shown, envelope 100 is formed from two juxtapositioned sheets which are sealed on all ends and sides face to face except for filling gap 102, as illustrated. Pouch 100 can be made by sealing two webs of material at both sides and ends face to face using crimping rollers for the side seal and rotary crimp jaws for the end seals in a continuous motion.

Figure 11:
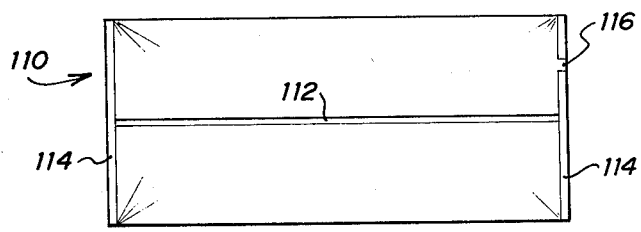

FIG. 11 illustrates an envelope 110 in the form of a pillow pouch which can be made from a tubular formed pouch with a lap 112 sealed together and the ends 114 sealed together. In this instance, the filling gap 116 remains in the pouch as illustrated and discussed above in relation to FIGS. 9 and 10. The pillow pouch can be made from a single web of material which is shown over the forming guide and around a tube. A fin or lap body heat seal is made and the material is advanced by a belting action or by the end heat sealing jaws making the end seals and simultaneously cutting off the tubing in a continuous process.

Figure 12:
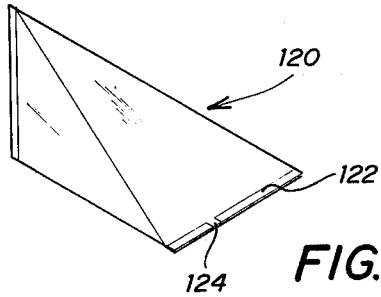

In like manner, FIG. 12 illustrates a tetrahedral pouch 120 made from a tube of the envelope material.

Figure 13:
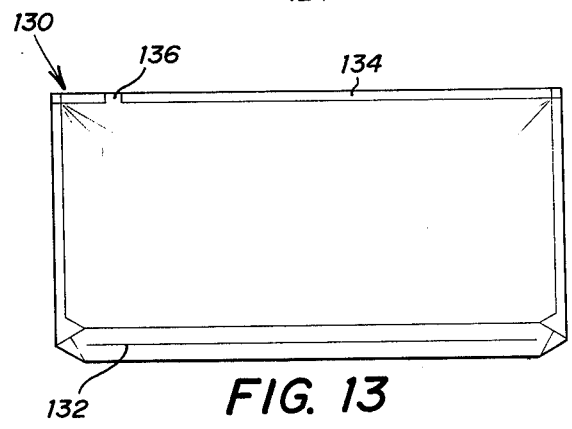

In the tetrahedral pouch, a lap or face to face body seal and face to face end seals at 90° to each other are formed as illustrated as seals 122 in FIG. 12. The tube can be preformed or formed in the process of forming the tetrahedral pouch. For example, a web material can be drawn over a forming guide and around a metal tube. The body heat seal is made and the film is advanced by either the end heat sealing jaws or by belting action. The cross end seals are made alternately in a 90° angle to the preceding cross heat seal. Again, the filling tap 124 remains as illustrated in the pouch. Another simple envelope is illustrated in FIG. 13 as a gusset pouch. This is made very similar to the envelope of FIG. 9 except a fold or gusset 132 is made in the pouch before seal 134 and filling gap 136 are formed.

Figure 14:
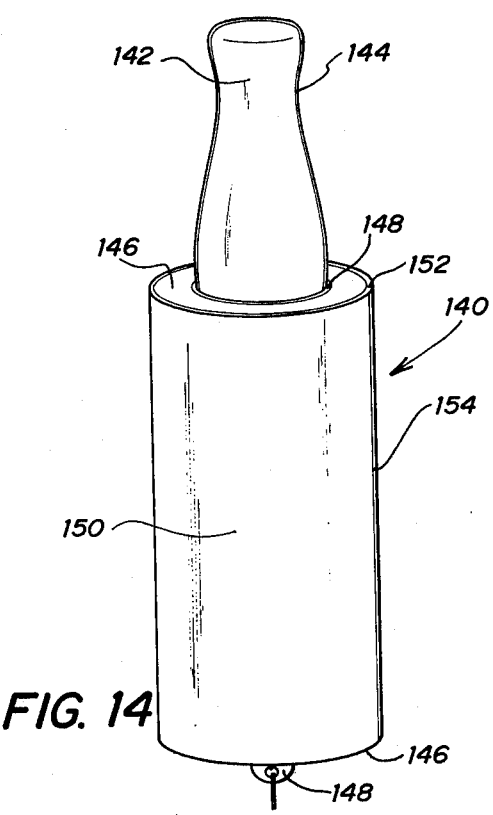

In addition to the simple shapes, more complex shaped balloons can be made in the scope of the subject invention such as illustrated in FIG. 14. A bottle shaped balloon made in accordance with the subject invention is shown in FIG. 14. The balloon 140 is made with five separate panels of composite material. As shown, the neck of bottle 140 is made from two panels 142 which are sealed together along peripheral portions thereof at areas 144. The base of panel 142 are sealed to a circular panel 146 at seal areas 148. The circular panel 146 encloses the top of cylindrical shaped panel 150 at seal areas 152. Cylindrical shaped panel 150 is made from a single piece of composite envelope material sealed with an overlap seal at seal area 154. The base of bottle 140 comprises another circular panel 146 with an attachment tab 148 for attaching a tether line thereto. Complex shapes such as bottle 140 can be used not only as toys but also in advertising and will be maintained buoyant for an indefinite period of time. Thus, various sizes and shapes of air buoyant balloons can be made in the scope of the subject invention with the metal-nonelastomeric polymer composite envelope material. It is only necessary that the nonelastomeric polymer have a continuous coating of a metal or a layer of metal laminated thereto or therewithin. Although such composite materials are generally used in the lay-flat condition, they can typically be formed into curved or dished sections having a maximum depth of about 50% of the panel size using vacuum or mechanical dies without harm to the metal layer. The envelope can have an internal volume up to about 20 cu. ft. and have a ratio of its volume taken to the two-thirds power to its surface area in the range from about 0.21 to about 0.01 and an average envelope weight in the range of from about $2.6 \times 10^{-4}$ gm/cm$^2$ to about $1.7 \times 10^{-2}$ gm/cm$^2$. All such balloons will have a buoyant life several times greater than conventional air buoyant balloons of comparable size. The useful buoyant lifetime can be varied with the choice of envelope materials which are used in the scope of the subject invention and can be easily determined from simple calculation. Furthermore, in relation to the envelope weight, the minimum weight of the nonelastomeric polymer which is used in all balloons is $2.4 \times 10^{-4}$ gm/cm$^2$ ($4.9 \times 10^{-4}$ lbs./ft.$^2$). Generally, more polymer can be utilized in the envelopes which are made with the vapor deposited metals. For example, the maximum weight of polymer which can be used in envelopes which carry at least a layer of vapor deposited metal is about $1.7 \times 10^{-2}$ gm/cm$^2$ ($3.5 \times 10^{-2}$ lbs./ft.$^2$). Furthermore, the maximum weight of polymer in rolled metal laminate balloon envelopes made in the scope of the subject invention is about $1.65 \times 10^{-2}$ gm/cm$^2$ ($3.4 \times 10^{-2}$ lbs./ft.$^2$). In working with envelopes carrying the vapor deposited metal in general, the minimum total envelope weight is $2.6 \times 10^{-4}$ gm/cm$^2$ ($5.3 \times 10^{-4}$ lbs./ft.$^2$). Likewise, when working with the metal laminates having a thin sheet of metal laminated to the nonelastomeric polymer, the minimum envelope weight is about $2.3 \times 10^{-3}$ gm/cm$^2$ ($4.7 \times 10^{-3}$ lbs./ft.$^2$). In general, the specific envelope material can be tailored for any specific shape to obtain the desired buoyant lifetime by simple calculation.

For any set of similar balloons, the following geometric relationships exist:

$$S = BD^2 \quad (1)$$

$$V_o = CD^3 \quad (2)$$

$$S = \theta V_o^{\frac{2}{3}} \quad (3)$$

wherein
$D$ = scale size for any balloon of given geometric configuration
$S$ = surface area of the envelope
$V_o$ = initial volume of the fully inflated envelope
$B$, $C$ and $\theta$ are constants independent of size for any given geometric configuration.

Because many balloons are difficult to define geometrically, it is generally convenient to choose the total thickness, $r$ of the polymer layers of the envelope as the scale size (D)

Thus let: $r = D$

Then from equations (1), (2) and (33)

$$S = B_r r^2 \quad (4)$$

$$V_o = C_r r^3 \quad (5)$$

$$S = \theta V_o^{\frac{2}{3}} \left( \theta = \frac{B_r}{C_r^{\frac{2}{3}}} \right) \quad (6)$$

Where $B_r$ and $C_r$ are identical respectively to B and C for the particular case where $r = D$.

Using these equations, various values of $\theta$ can be calculated for any given shape. For example, $\theta$ values for typical shapes are set forth in Table 1 below:

Table 1

| Approximate $\theta$ Values | | |
|---|---|---|
| Shape | Theta | $\frac{1}{\text{Theta}} \left( \frac{V_o^{\frac{2}{3}}}{S} \right)$ |
| Cube | 6.0 | ~ 0.17 |
| Sphere | ~ 4.84 | ~ 0.21 |
| Lay-flat square | ~ 5.5 | ~ 0.18 |
| Human shape | ~ 10.0 | ~ 0.10 |
| Rectangular parallelepiped (30×30×1) | ~ 20.6 | ~ 0.05 |
| Tetrahedron | ~ 7.2 | ~ 0.14 |
| Cylinder (length = 10, diam. = 1) | ~ 8.35 | ~ 0.12 |

In determining the buoyant lifetime ($T_L$) of balloons made with the composite envelopes of the subject invention, the rate of diffusion ($-dV/dT$) of the lift gas from inside the nonextensible envelope is given by the equation:

$$-\frac{dV}{dT} = \frac{FPS^*}{r} \quad (7)$$

where: P = permeability constant characteristic of the polymer material or combination of polymer materials and the lift gas chosen -continued T = elapsed time since inflation
r = total thickness of the polymer layer or layers of the envelope material*
V = volume of lift gas at time $T(V=V_o$ at $T=0)$
F = effective fraction of the envelope surface not contiguously bonded to a metal layer

*The relatively minor areas of overlapping or butted seals are neglected in these equations.

The weight (downward force = $W$) of a balloon envelope is given by the equation:

$$W = \rho_E rS + \rho_\mu r_\mu S^* \quad (8)$$

where: $\rho_E$ = average density of the envelope polymer materials*
$\rho_\mu$ = density of metal
$r_{\mu j}$ = total average thickness of the metal layer or layers

*The relatively minor areas of overlapping or butted seals are neglected in these equations.

The gross lifting force, U, of the gas in the balloon is given by the equation:

$$U = V(\rho \text{ air} - \rho \text{ gas}) = V(\Delta\rho) \quad (9)$$

where:
$\rho$ air = density of air
$\rho$ gas = density of lift gas in the envelope
$\Delta\rho = \rho$ air $- \rho$ gas The net lifting force (L) is obtained by combining equations (8) and (9) to give:

$$L = U - W = V(\Delta\rho) - \rho_E rS - \rho_\mu r_\mu S \quad (10)$$

let: $D = r$, then the following equation can be derived by combining equations (5), (6) and (10):

$$L = V(\Delta\rho) - \rho_E \theta \frac{V_o}{C_r^{\frac{1}{3}}} - \rho_\mu r_\mu \theta V_o^{\frac{2}{3}} \quad (11)$$

differentiation of (11) with respect to time yields:

$$\frac{dL}{dT} = (\Delta\rho)\frac{dV}{dT} \quad (12)$$

Since $D = r$, combining equations (5), (6), (7) and (12) yields:

$$dL = -(\Delta\rho)F\theta C_r^{\frac{1}{3}} V_o^{\frac{2}{3}} dT \quad (13)$$

When $T = 0$, $L = L_o$ and when $T = T_L$ (buoyant lifetime), $L = 0$. Thus integration of equation (13) and algebraic arrangement gives:

$$T_L = \frac{L_o}{F\theta C_r^{\frac{1}{3}} V_o^{\frac{2}{3}}(\Delta\rho)} \quad (14)$$

When $L = L_o$, $V = V_o$. Thus substitution of equation (11) into equation (14) gives:

$$T_L = \frac{V_o^{\frac{2}{3}}\left[(\Delta\rho) - \frac{\rho_E \theta}{C_r^{\frac{1}{3}}}\right] - \rho_\mu r_\mu V_o^{\frac{1}{3}}}{F\theta C_r^{\frac{1}{3}}(\Delta\rho)} \quad (15)$$

In the particular preferred case of thinly vapor deposited metal composite envelopes the value of $r_\mu$ may be assumed to be a vanishingly small constant with the result that equation (15) can be written in the form of the simpler approximate equation (16).

$$T_L \approx \frac{V_o^{\frac{2}{3}}\left[(\Delta\rho) - \frac{\rho_E \theta}{C_r^{\frac{1}{3}}}\right]}{F\theta C_r^{\frac{1}{3}}(\Delta\rho)} \quad (16)$$

Furthermore, if $r_\mu$ is constant then F is also constant; thus equation (16) shows that otherwise geometrically similar balloons having identical vapor deposited metallic layers and made from identical materials have, under identical conditions, lifetimes which are proportional to the $\frac{2}{3}$ power of the initial volume. Under these restrictions, three constants, $K_1$, $K_2$ and $K_3$, can be defined by the following equations:

$$T_L \approx K_1 V_o^{\frac{2}{3}} \quad (17)$$

where $K_1 = \frac{(\Delta\rho) - \frac{\rho_E \theta}{C_r}}{F\theta C_r^{\frac{1}{3}}(\Delta\rho)}$ and from combining (17) and (6):

$$T_L \approx K_2 S \text{ where } K_2 = \frac{K_1}{\theta} \quad (18)$$

and from combining (4) and (18):

$$T_L \approx K_3 r^2 \text{ where } K_3 = K_2 B_r \quad (19)$$

Since all scale dimensions of similar balloons are proportional, (19) can also be written as:

$$T_L \approx K_4 D^2 \quad (20)$$

where $D$ is any definable scale size (e.g., diameter) and $K_4$ is a constant for any given balloon geometry and composition under standard conditions.

Equation (15) may be used to calculate the buoyant lifetime of any balloon having a metallic layer in the envelope. Any of equations (16) through (20) may be similarly applied to the specific case where the metal layer is a very thin vapor deposited material.

Furthermore, based on equation (6), the minimum volume and minimum surface area for any particular shape of balloon can readily be derived as a function of $T_L$ as is shown in equations (21) and (22) below:

$$V_{o(min)} = \left[\frac{\theta(E + RT_L)}{\Delta\rho}\right]^3 \quad (21)$$

$$S_{(min)} = \theta^3 \left[\frac{E + RT_L}{\Delta\rho}\right]^2 \quad (22)$$

where
$E$ = weight per unit area of envelope
$R$ = rate of buoyancy loss per unit area of envelope Balloons of various shapes made in the scope of the subject invention can have extremely long buoyant lifetimes, i.e., a year or more. A comparison of the minimum volumes for various shaped balloons having a 1 year buoyant lifetime ($T_L$) which can be made in the subject invention with 0.25 mil polyester as the nonelastomeric polymer in the composite combined with both sheet aluminum and vapor deposited aluminum in the composite, respectively, is shown in Table 2 below:

Table 2

Comparison of Rolled Aluminum (0.17 mil) and Vapor Deposited Aluminum on the Minimum Volume (Ft³) of Balloons With One Year Buoyant Lifetimes ($T_L$)

| $\theta$ | | 4.85 | 6 | 10 | 20.6 |
|---|---|---|---|---|---|
| Envelope Material | | | | | |
| 0.17 mil rolled Al + 0.25 mil coated polyester | $V_{min} =$ | 0.051 | 0.098 | 0.45 | 3.96 |
| $4 \times 10^{-3}$ mil vapor deposited Al + 0.25 mil coated polyester | $V_{min} =$ | 0.0070 | 0.0134 | 0.062 | 0.542 |

Table 3 is presented to show comparison of several materials suitable for use in the construction of helium filled balloons, within the scope of this invention, in the size range of 0.25 to 2 cu. ft., each having a typical shape factor of $\theta = 10$.

The optimum envelope weight is listed as that corresponding to $U/W$' 2 because this generally corresponds to the theoretical optimum value for all polymer balloons. The entries for $U/W = 1$ (neutral buoyancy) are included because substantially neutrally buoyant including slightly negatively buoyant balloons are suitable for toys or advertising devices which depend on rising air currents, e.g., those over a heat source, for buoyancy and such balloons can be made in the scope of the subject invention.

Table 3

Comparison of Materials For The Construction of Helium Balloons ($\theta = 10$) in the Size Range 0.25 – 2.0 Ft.³

| | VOLUME (FT³) | | | |
|---|---|---|---|---|
| | 0.25 | 0.50 | 1.0 | 2.0 |
| Surface Area (Ft²) | 3.97 | 6.30 | 10.0 | 15.9 |
| (cm²) | 3,690 | 5,850 | 9,290 | 14,700 |
| Optimum Envelope Wt(gm) ($U/W = 2$) | 3.54 | 7.08 | 14.2 | 28.3 |
| Maximum Envelope Wt (gm) ($U/W = 1$) | 7.08 | 14.2 | 28.3 | 56.6 |
| Optimum Envelope Wt per Unit Area (gm/cm²) | $9.59 \times 10^{-4}$ | $1.21 \times 10^{-3}$ | $1.52 \times 10^{-3}$ | $1.92 \times 10^{-3}$ |
| Maximum Envelope Wt per Unit Area (gm/cm²) | $1.92 \times 10^{-3}$ | $2.42 \times 10^{-3}$ | $3.05 \times 10^{-3}$ | $3.83 \times 10^{-3}$ |
| Weight Range per Unit Area of Typical Polymer Films (gm/cm²) | ¼ mil $5.97$–$8.89 \times 10^{-4}$ 1 mil $2.39$–$3.56 \times 10^{-3}$ ½ mil $1.19$–$1.78 \times 10^{-3}$ → | | | |
| Weight of Rolled Aluminum per Unit Area (gm/cm²) | 0.17mil $1.17 \times 10^{-3}$ 0.35mil $2.40 \times 10^{-3}$ → | | | |
| Typical Avg. Weight of Vapor Deposited Aluminum per Unit Area (gm/cm²) | $2.1 \times 10^{-5}$ → | | | |

Table 4

Description Of Film Samples For Helium Permeation

| No. | Description | Thickness (mil) |
|---|---|---|
| A | ½ mil polypropylene / ½ mil polyethylene / .00035 aluminum / 2 mils polyethylene | 3.6 |
| B | Metallized (Aluminum) polyester ½ mil / 1½ mils polyolefin | 2.0 |
| C | Saran coated metallized (Aluminum) polyester ½ mil / 1½ mils polyolefin | 2.0 |
| D | Metallized (Aluminum) polyester ½ mil / 2 mils polyethylene | 2.5 |
| E | Metallized (Aluminum) polyester ½ mil (2 sides) / 1 mil polyethylene | 1.5 |
| F | Saran coated Polyester ½ mil / 1 mil saran | 1.5 |

Balloons made with the above composite panel materials were filled with helium and monitored for helium permeation. The helium permeations measured in grams of buoyancy lost per 1000 sq. in. of film are set forth in Table 5 below:

Table 5

| Helium Permeability - Test Results | |
|---|---|
| No. | Helium Permeation* |
| A | 0.2 |
| B | 3.6 |
| C | 7.0 |
| D | 6.8 |
| E | 1.1 |
| F | 94.0 |

*Helium Permeation = buoyancy loss in grams per 1000 square inches of envelope material per year.

In general, despite the presence of numerous original pinholes in the metal layers and a far greater number of holes or fissures arising from assembly and handling, it has been found that continuously bonded laminates made of 0.35 mil rolled aluminum foil and polyolefin film (usually 1.25 to 3.25 mils) show a buoyancy loss rate (R) of less than 0.02 grams per year per sq. ft. or $2.2 \times 10^{-5}$ grams per year per cm². Some typical balloons of the subject invention made with composite panel materials A through F set forth in Table 4 below were made and compared to a balloon made with composite laminate material F in Table 5 below which is not made in the scope of the subject invention:

As can be readily seen, the balloons made in accordance with the subject invention are substantially impermeable and therefore remain buoyant over an extended period of time as compared with the balloons made with the composite material F.

While this invention has been described in relation to its preferred embodiment, it is to be understood that various modifications thereof will now be apparent to one skilled in the art upon reading the specification and it is intended to cover such modifications as fall within the scope of the appended claims.

I claim:

1. A substantially permanently air buoyant balloon comprising a substantially gas impermeable envelope filled with a lighter than air gas at about atmospheric pressure, said envelope being made from attached panels of a composite material comprising at least one nonelastomeric polymer sheet continuous throughout said panel which has a continuous opaque coating of a vapor deposited metal on at least one side thereof, said panels being attached to form said envelope by continuous seals along peripheral portions thereof, said envelope having an internal volume of up to about 20 cu. ft. and having a ratio of its volume taken to the two-thirds power to its surface area of from about 0.21 to about 0.01, and an average envelope weight in the range of from about $2.6 \times 10^{-4}$ gm/cm$^2$ to about $1.7 \times 10^{-4}$ gm/cm$^2$.

2. The air buoyant balloon of claim 1 wherein said continuous coating of vapor deposited metal has a thickness in the range of from about $3 \times 10^{-7}$ inch to about $2 \times 10^{-3}$ inch.

3. The air buoyant balloon of claim 1 wherein said layer of vapor deposited metal has a thickness in the range of from about $1 \times 10^{-6}$ inch to about $5 \times 10^{-5}$ inch.

4. The air buoyant balloon of claim 1 wherein said vapor deposited metal is aluminum.

5. The air buoyant balloon of claim 1 wherein said nonelastomeric polymer is selected from polyolefins, polyvinyl chloride, polyesters, polyvinylidene chloride, polyvinyl alcohol, regenerated cellulose, polyurethane, ethylene vinyl acetate copolymer, ionomers, polyamides and nitrile polymers.

6. The air buoyant balloon of claim 1 wherein said panels of composite material comprise a first said nonelastomeric polymer sheet having said continuous coating of vapor deposited metal thereon, and a second sheet of a nonelastomeric polymer continuously bonded to said vapor deposited metal thereby leaving said vapor deposited metal sandwiched between said first and second sheets of nonelastomeric polymer.

7. The air buoyant balloon of claim 6 wherein said metal is aluminum.

8. The air buoyant balloon of claim 1 wherein said panels of composite material comprise said nonelastomeric polymer sheet having a continuous coating of a vapor deposited metal on both sides thereof.

9. The air buoyant balloon of claim 8 wherein said metal is aluminum.

10. The air buoyant balloon of claim 1 wherein said lighter than air gas is helium.

11. A substantially permanently air buoyant balloon comprising a substantially gas impermeable envelope filled with helium at about atmospheric pressure, said envelope being made from attached panels of a composite material comprising at least one nonelastomeric polymer sheet continuous throughout said panel which has a continuous coating of a vapor deposited metal on at least one side thereof, said continuous coating having a thickness in the range of from about $1 \times 10^{-6}$ to about $5 \times 10^{-5}$ inch, said panels being attached to form said envelope by continuous seals along peripheral portions thereof, said envelope having an internal volume of up to about 20 cu. ft. and having a ratio of its volume taken to the two-thirds power to its surface area of from about 0.21 to about 0.01 and an average envelope weight in the range of from about $2.6 \times 10^{-4}$ gm/cm$^2$ to about $1.7 \times 10^{-2}$ gm/cm$^2$.

12. The air buoyant balloon of claim 11 wherein said vapor deposited metal is aluminum.

13. The air buoyant balloon of claim 11 wherein said nonelastomeric polymer is selected from polyolefins, polyvinyl chloride, polyesters, polyvinylidene chloride, polyvinyl alcohol, regenerated cellulose, polyurethane, ethylene vinyl acetate copolymer, ionomers, polyamides and nitrile polymers.

14. The air buoyant balloon of claim 11 wherein said panels of composite material comprise a first said nonelastomeric polymer sheet having said continuous coating of vapor deposited metal thereon, and a second sheet of a nonelastomeric polymer continuously bonded to said vapor deposited metal thereby leaving said vapor deposited metal sandwiched between said first and second sheets of nonelastomeric polymer.

15. The air buoyant balloon of claim 14 wherein said metal is aluminum.

16. The air buoyant balloon of claim 11 wherein said panels of composite material comprise said nonelastomeric polymer sheet having a continuous coating of a vapor deposited metal on both sides thereof.

17. The air buoyant ballon of claim 16 wherein said metal is aluminum.

UNITED STATES PATENT AND TRADEMARK OFFICE
CERTIFICATE OF CORRECTION

PATENT NO. : 4,077,588
DATED : March 7, 1978
INVENTOR(S) : Gerald L. Hurst

It is certified that error appears in the above-identified patent and that said Letters Patent are hereby corrected as shown below:

Column 1, lines 6 & 7, after "substantially" insert --permanent buoyant--;
line 25, change "as" to --has--.
Column 2, line 36, after "have" insert --also--.
Column 3, line 64, change "two dimension" to --two dimensional--.
Column 6, line 4, change "isonomers" to --ionomers--.
Column 9, line 10, change "tap to --gap--,
line 24, change "panel" to --panels--.
Column 10, line 31, change "(33)" to --(3)--;
line 52, change "0 18" to --0.18--.
Column 11, line 16, change "$r_{\mu j}$" to --$r_{\mu j}$--;
line 42 after "$\frac{dL}{dT}$" and before "$^\mu$($\Delta\rho$)" insert --=--;
line 52, change "arrangement" to --rearrangement--.
Column 12, line 22, change "Cr" to --$Cr^{1/3}$--.
Column 13, line 20, change "U/W'2" to --U/W = 2--.
Column 15, line 18, change "$1.7 \times 10^{-4}$" to --$1.7 \times 10^{-2}$--.

Signed and Sealed this

Fifth Day of June 1979

[SEAL]

Attest:

RUTH C. MASON
Attesting Officer

DONALD W. BANNER
Commissioner of Patents and Trademarks

REEXAMINATION CERTIFICATE (1397th)

United States Patent [19]

Hurst

[11] B1 4,077,588

[45] Certificate Issued Jan. 1, 1991

[54] PERMANENTLY BUOYANT BALLOON

[75] Inventor: Gerald L. Hurst, Austin, Tex.

[73] Assignee: Leslie Barton, a part interest

Reexamination Request:
No. 90/001,617, Oct. 12, 1988

Reexamination Certificate for:
| | |
|---|---|
| Patent No.: | 4,077,588 |
| Issued: | Mar. 7, 1978 |
| Appl. No.: | 613,518 |
| Filed: | Sep. 15, 1975 |

Certificate of Correction issued Jun. 5, 1979.

[51] Int. Cl.$^5$ .................. B64B 1/40; A63H 27/10
[52] U.S. Cl. ........................... 244/31; 446/220; 446/226
[58] Field of Search ............ 244/31, 33, 128, 126, 244/153–155, 105; 280/480; 446/220, 222, 225, 226; 427/250

[56] References Cited

U.S. PATENT DOCUMENTS

| | |
|---|---|
| 1,801,666 | Geer . |
| 2,039,372 | Wickman . |
| 2,863,179 | Gaugler . |
| 2,993,806 | Fischa et al. . |
| 3,149,017 | Ehrreich et al. . |
| 3,340,732 | Scoggins . |
| 3,445,055 | Port et al. . |
| 3,480,464 | Lacy . |
| 3,718,512 | Hurst . |
| 3,874,325 | Cocker . |

FOREIGN PATENT DOCUMENTS

227150  Fed. Rep. of Germany .

OTHER PUBLICATIONS

D. Murry, "O'Sullivan's Wonderful Lead Balloon," *Popular Science*, Feb. 1, 1961, pp. 74–77, 220–228.
Stenlund et al, "PAGEOS Fabrication Accuracy and Reliability," *Proceedings, Fourth AFCRL Scientific Balloon Symposium*, AFCRL-67-0075, Jan. 1967, Special Reports, No. 57, pp. 133–142.
Slater, "Expanded Use of Inflatables Through New Materials," *Proceedings of the AFCRL Scientific Balloon Symposium*, Air Force Surveys in Geophysics No. 154, 1965, pp. 41–66.
Rittenhouse et al, *Space Materials Handbook* (Supplement 1 to the Second Edition Space Materials Experience), NASA SP-3025, ML-TDR-64-40, Supp. 1 1966, pp. S-21, S-23.
Angell et al, "Analysis of Some Preliminary Low-Level Constant Level Balloon (Tetroon) Flights," *Monthly Weather Review*, vol. 88, No. 7, Jul. 1960, pp. 235–288.
Booker et al, "Superpressure Balloons for Weather Research," *Journal of Applied Meteorology*, vol. 4, Feb. 1965, pp. 122–129.

Schjeldahl Co. balloon brochure, "Superpressure Balloons", Lenke and Wolinski affidavits.
Schjeldahl Co. balloon brochure, "Passive Meteorological Systems".
Adams et al, "Metallizing," *Encyclopedia of Polymer Science and Technology*, vol. 8, Interscience Publishers, a div. of John Wiley & Sons, Inc., N.Y., 1968, pp. 639–640.
Peters, "Metallized Film Improves Appearance And Shelf Life For Institutional Ground Coffee Packages," *Food Product Development*, Sep. 1975, pp. 60–62.
"Snack Packaging Past and Present," *Snack Food*, vol. 59, No. 3, (Mar. 1969), pp. 35–37, 65.
"The Making of a Spaceship," *Toys and Novelties*, p. 32, Dec. 1, 1964.
Donovan, "Films—A Guide to Selection and Applications," *British Plastics*, vol. 9, No. 42, Sep. 1969, pp. 107–110.
*Vapor Deposition* (Edited) Powell, John Wiley & Sons, Inc. New York, 1966, pp. 3–4, 221–248 and 584–585.
Wright, "Reynolds Number Effects on Ascending Spherical Balloons," *Journal of Spacecraft and Rockets*, vol. 4, No. 3, 1967, pp. 407–408.
"Metreorological Balloon," *Astronautics and Aeronautics*, Aug. 1964, p. 74.
Henry et al, "Fast-rising Stable Streamlined Balloons for High Resolution Wind Measurements," *Proceedings, Sixth AFCRL Scientific Balloon Symposium*, AFCRL-7-0-0543, Oct. 1970, pp. 459–469.
Whitehead, "Vacuum Metalizing Enhances Packaging Films' Barrier Values," *Package Engineering*, Aug. 1966, pp. 69–71.
Pollock, "Metallized film improves barrier/appearance—transmits light," *Package Engineering*, Feb. 1971, pp. 58–59.
DuPont Technical Information Bulletin M-3C, Jul. 1968, Stenlund affidavit.
Briston, *Plastics Films*, John Wiley & Sons, N.Y., 1974, pp. 178–179, 256, 286, 294–297.
Minnesota Mining and Manufacturing, Scotchpak product brochure.
Schuette, "Plastic Bags For Collection Of Gas Samples," *Atmospheric Environment*, Pergamon Press, vol. 1, pp. 515–519, 1967.
"The promise of polyester film," *Modern Plastics*, Dec. 1966, pp. 10–13, 195.
"New Polyester Film—Specially-developed metallized polyester helps launch space toy," *Plastics World*, Dec. 1964, pp. 10–11.
"Converters Enter 'Space' Race With Film Toy," *Modern Converter*, Jan. 20, 1965, p. 24.
*Plastics Film Technology* (Edited) Park, Van Nostrand Reinhold Company, 1969, pp. 192–196.
Gudimov, et al, "Effect of Metallization of Polymer Films on Their Gas Permeability," *All-Union Institute of Aviation Materials*, vol. 7, No. 2, pp. 185–188 (1971).

*Primary Examiner*—Galen Barefoot

[57] ABSTRACT

A substantially permanently buoyant balloon suitable

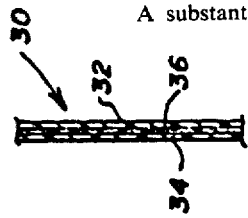

for use as a toy or in advertising, for example, is provided which includes an envelope containing a lighter than air gas such as helium, which envelope is made from attached panels of a nonelastomeric polymer sheet material carrying a continuous metal layer on at least one side thereof. The metal layer can either be a thin metal film contiguously bonded to the polymer, or can be metal which is vapor deposited over the surface of the polymer. The balloon itself is constructed so that the ratio of its volume taken to the two-thirds power divided by its surface area is in the range of from about 0.21 to about 0.01, and the weight of the envelope can range from about $2.6 \times 10^{-4}$ gm/cm$^2$ to about $1.7 \times 10^{-2}$ gm/cm$^2$. The envelope is preferably manufactured in two dimensional "lay-flat" form in any desired two dimensional shape unlike conventional balloon envelopes which are inherently three dimensional surfaces. Balloon envelopes having the above described volume to surface area ratio and made with the above described composite panel material will be maintained buoyant for an indefinite period of time when filled with the lighter than air gas.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-17 is confirmed.

* * * * *